(12) United States Patent
Batawi

(10) Patent No.: US 6,316,136 B1
(45) Date of Patent: Nov. 13, 2001

(54) INTERCONNECTOR FOR HIGH TEMPERATURE FUEL CELLS

(75) Inventor: Emad Batawi, Winterthur (CH)

(73) Assignee: Sulzer Hexis AG, Winterhur (CH)

( * ) Notice: Subject to any disclaimer, the term of this patent is extended or adjusted under 35 U.S.C. 154(b) by 0 days.

(21) Appl. No.: 09/249,242

(22) Filed: Feb. 11, 1999

(30) Foreign Application Priority Data

Feb. 17, 1998 (EP) .................................................. 98810125

(51) Int. Cl.$^7$ ........................................................ H01M 8/04
(52) U.S. Cl. ............................................. 429/26; 429/34
(58) Field of Search .......................... 429/12, 26, 30–34, 429/38, 39

(56) References Cited

U.S. PATENT DOCUMENTS

| 5,064,734 | * | 11/1991 | Nazmy . |
| 5,270,131 | | 12/1993 | Diethelm . |
| 5,691,075 | * | 11/1997 | Batawi . |

FOREIGN PATENT DOCUMENTS

| 410159 A | * | 6/1990 | (EP) . |
| 410166 A | * | 7/1990 | (EP) . |
| 0410159A1 | | 1/1991 | (EP) . |
| 0410166A1 | | 1/1991 | (EP) . |
| 0424732A1 | | 5/1991 | (EP) . |
| 0714147A1 | | 5/1996 | (EP) . |
| 8287929 | | 11/1996 | (JP) . |

| WO 96/28855 | 9/1996 | (WO) . |
| WO 97/35349 | 9/1997 | (WO) . |

OTHER PUBLICATIONS

Chemical Abstracts, vol. 126, No. 6, Feb. 10, 1997, Columbus, Ohio, US; abstract No. 77495, Fujimoto, Tetsuo Et Al: "Planar ceramic interconnectors for solid electolyte fuel cells and their manufacture", XP002071911, Abstract, & JP 08 287 929 A (Mitsubishi Heavy Ind) Nov. 1, 1996.
Patent Astracts of Japan, vol. 97, No. 3, Mar. 31, 1997 & JP 08 287929 A (Mitsubishi Heavy Ind), Nov. 1, 1996, Abstract.
Patent Abstracts of Japan, vol. 096, No. 011, Nov. 29, 1996 & JP 08 185870 A (Tonen Corp; Sekiyu Sangyo Kasseika Center) Jul. 16, 1996, Abstract.
Patent Abstracts of Japan, vol. 096, No. 011, Nov. 29, 1996 & JP 08 171924 A (Tonen Corp; Sekiyu Sangyo Kasseika Center), Jul. 2, 1996, Abstract.

* cited by examiner

Primary Examiner—Gabrielle Brouillette
Assistant Examiner—Susy Tsang
(74) Attorney, Agent, or Firm—Townsend and Townsend and Crew LLP

(57) ABSTRACT

The interconnector (1) for high temperature fuel cells is arranged between a first and a second planar electrochemically active element (2, 2'). In this it separates a chamber (41) containing a combustion gas from a chamber (51, 53) containing oxygen. A porous sinter body (10) of the interconnector has pores (101) which are at least partly sealed by a medium (11'). Through the sealing, a passage of gases between the named chambers (41, 51) is prevented.

10 Claims, 3 Drawing Sheets

INTERCONNECTOR FOR HIGH
TEMPERATURE FUEL CELLS

BACKGROUND OF THE INVENTION

1. Field of the Invention

The invention relates to an interconnector for high temperature fuel cells and to a fuel cell battery.

2. Description of the Prior Art

The fuel cells of a fuel cell battery in accordance with the invention comprise (see EP-A 0 714 147) in each case a so-called PEN and an interconnector which connects the cells adjacent to the PEN in an electrically conducting manner and at the same time separates a combustion gas (in particular a mixture of carbon monoxide and hydrogen) from a gaseous oxygen carrier (in particular air). The PEN has a planar three-layer construction consisting namely of a solid electrolyte (E), a positive electrode (P) and a negative electrode (N). Electrochemical reactions at the PEN with the fuel and the oxygen of the oxygen carrier take place at about 900° C.

Due to the high operating temperatures, a material must be used for the interconnectors of which the coefficient of thermal expansion is largely equal to that of the solid electrolyte. A powder-metallurgically manufactured alloy is known which is suitable for the manufacture of interconnectors. This material, which consists mainly of chromium (about 95% by weight) and which is manufactured through sintering at high pressure and high temperature, is expensive. The alloy is manufactured in plate form and must therefore be further processed in a form suited to the function of the interconnectors, with complicated and expensive work steps being required and material being lost.

SUMMARY OF THE INVENTION

The object of the present invention is to provide an interconnector which permits substantial cost savings.

The interconnector for high temperature fuel cells is arranged between a first and a second planar electrochemically active element, a so-called PEN. In this it separates a chamber containing a combustion gas from a chamber containing oxygen. A porous sinter body of the interconnector has pores which are at least partly sealed by a medium. Through the sealing, a passage of gases between the named chambers is prevented.

The interconnector in accordance with the present invention comprises a sinter body which prevents a mixing of the reactants and which is porous, with its pores being filled with an additional medium for the sealing off. The porosity permits more economical manufacturing methods. Other powder mixtures can also be used, for example those which consist to a large part of ceramic material with a low coefficient of thermal expansion and for which the manufacture of a tight, pore-free solid body would not be possible. In particular the powder mixture can also largely be brought into the form of the finished part though a form compression procedure.

Chromium is an important constituent in known interconnectors because this metal has a low coefficient of thermal expansion and its oxide is electrically conducting. At the operating temperature of the fuel cells, however, a material transport of sublimated chromium oxide takes place via the gas phase to the electrodes, through which their activity is impaired. For this reason it is necessary to coat the surfaces of the interconnector with a material which acts as a chromium oxide barrier (for this, cf. EP-A 0 714 147=P.6651).

For coating layers which act as chromium oxide barriers, ceramic materials (in particular Perovskite) or enamel come into consideration. An enamel, for example with the composition (in percentage by weight): MgO (5–15), $Al_2O_3$ (15–30), $B_2O_3$ (10–15), $SiO_2$ (35–55), MnO (15–30), has a softening point of about 1000° C., a coefficient of thermal expansion which coincides approximately with that of the solid electrolyte (about $8 \cdot 10^{-6}$ $K^{-1}$ at 800° C.) and the property of wetting an alloy well which is rich in chromium. This enamel is suitable not only as a chromium oxide barrier but also as a medium by means of which the pores of the sinter body can be sealed.

DETAILED DESCRIPTION OF THE PREFERRED EXEMPLARY EMBODIMENTS

Figure 1:
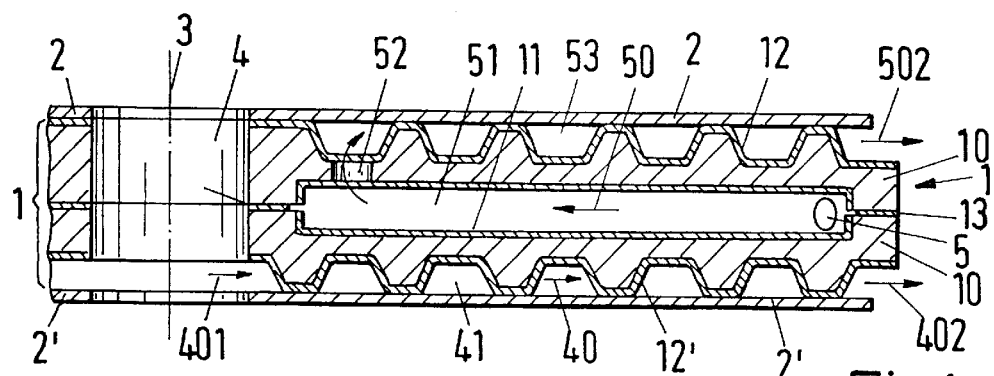
FIG. 1 is a radial cross-section through an interconnector in accordance with the invention of a centrally symmetric part.

FIG. 1 shows an interconnector 1 which is assembled from two sinter bodies 10. The inner sides of the sinter bodies 10 are treated with an enamel, which forms a gas tight boundary zone 11 through closure of the pores. The enamel additionally prevents a transport of chromium oxide.

The outer sides of the sinter bodies 10 have cover layers 12 and 12' respectively of a Perovskite which serves as a chromium oxide barrier and which is electrically conducting. The two sinter bodies 10 are connected, on the one hand, via electrically conducting solder films 13 to one another and, on the other hand, via the cover layers 12, 12' to a first PEN 2 and to a second PEN 2' so that the interconnector 1 produces an electrical connection between the two PEN's.

Air 50 acting as an oxygen carrier enters via a supply point 5 into a cavity 51 of the interconnector 1 where it takes up heat. The preheated air enters via an outlet opening 52 into a chamber 53 bordering on the PEN 2. After a giving off of oxygen to the PEN 2, the air leaves the fuel cell again (arrow 502).

The fuel cells are substantially centrally symmetric and are arranged in a stack with an axis 3. Combustion gas 401 is fed in via an axial passage 4 into the cells. In a chamber 41 the outwardly flowing gas 40 is distributed over the surface of the PEN 2' and its components are brought to a reaction on the electrode, with water and carbon dioxide arising as an exhaust gas. The exhaust gas 402 leaves the cell at the periphery.

Figure 2:
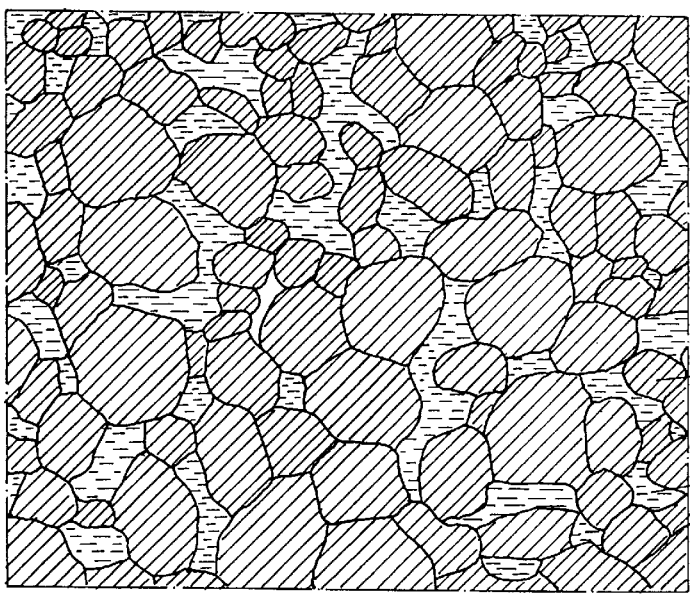
FIG. 2 is sectionally and in an enlarged view, a cross-section through a porous sinter body.

The body 10 shown in FIG. 2 consists of powder grains 100 which are sintered together and between which pores 101 are filled with a medium 11'. The powder grains 100 consist for example of metals, in particular of chromium, which together with a further metal, preferably iron, fuses to an alloy during the sintering. Further materials, for example ceramics, can be contained in the powder mixture which produce a favorable effect during the form compression. The powder grains 100 can also be metallically coated particles of ceramic materials.

Figure 3:
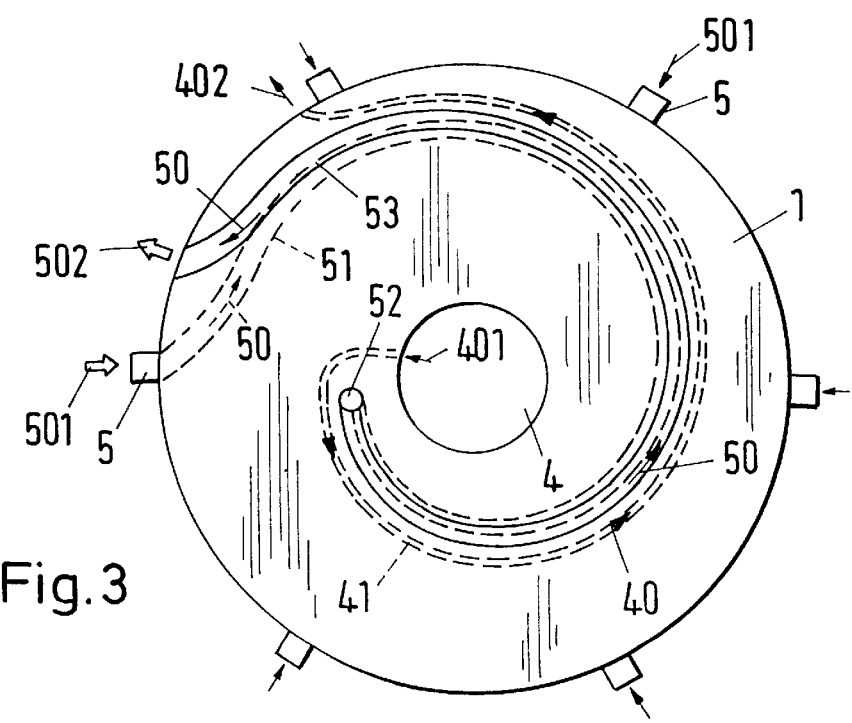
FIG. 3 is a schematic illustration relating to the gas and air flow in a fuel cell.

The air 50 and combustion gas 40 respectively which flow between adjacent PEN's 2, 2' in passages of the interconnector 1 are advantageously guided in passages in spiral or involute shape. The flow guidance in a group of passages 41, 51 and 53 of this kind is schematically illustrated in FIG. 3. Fresh, already preheated air 501 is fed in at the periphery of the interconnector 1 via an inlet tube 5. After flowing through the passage 51 and a further heating up, the air 50 passes upwardly in the middle through the opening 52 and is conducted from there via the passage 53 back to the periphery, where it leaves the cell as exhaust air 502. Fresh combustion gas 401 is fed in centrally from the axial passage 4 and conducted via the passage to the periphery, where it leaves the cell as exhaust gas 402.

Figure 4:
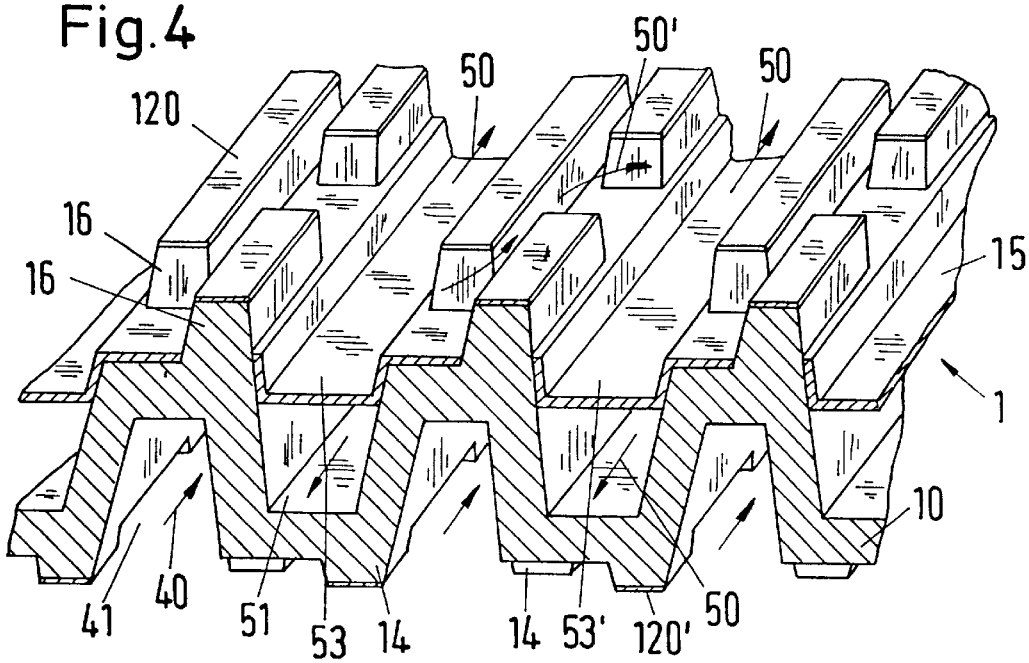
FIG. 4 is an interconnector in accordance with the invention illustrated in an oblique view.
Figure 5:
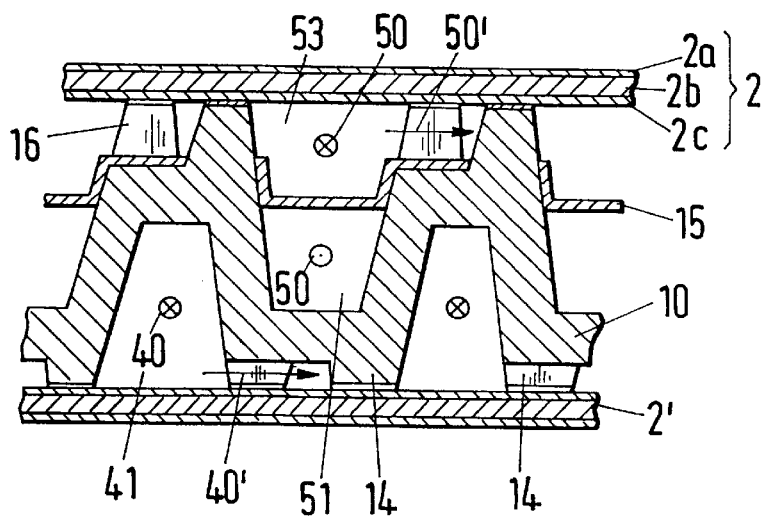
FIG. 5 is a cross-section through the interconnector of FIG. 4 with the two associated PEN's.

A particularly advantageous embodiment of the interconnector in accordance with the invention is shown in FIG. 4 in an oblique view and in FIG. 5 as a cross-section. The sinter body 10 produces a monolithic connection between electrically conducting contact surfaces 120 and 120' of the associated PEN's 2, 2' (see FIG. 5). A profiled film 15, which has suitably arranged apertures for combs 16 of the sinter body 10, forms a partition wall between parallel passages 51 and 53 (cf. FIG. 3). The film 15 need not be electrically conducting; it can consist of a chromium-free alloy, for example of an alloy which contains aluminium and silicon and in which the developing oxide layers consist of aluminium or silicon oxide (electrically non conducting). A film 15 of an alloy of this kind need not be coated with a chromium oxide barrier.

FIG. 5 shows the three-layer construction of the PEN 2: at the gas side an anode 2a, at the air side a cathode 2c and in between a solid electrolyte 2b which is permeable to oxygen ions at the operating temperature. The comb-like elevations 16 leave gaps free through which air 50' can flow in the radial direction from one passage 53 to the adjacent passage 53'. Comb-like elevations 14 are likewise provided at the gas side which enable a radial flow 40' of the combustion gas 40.

Figure 6:
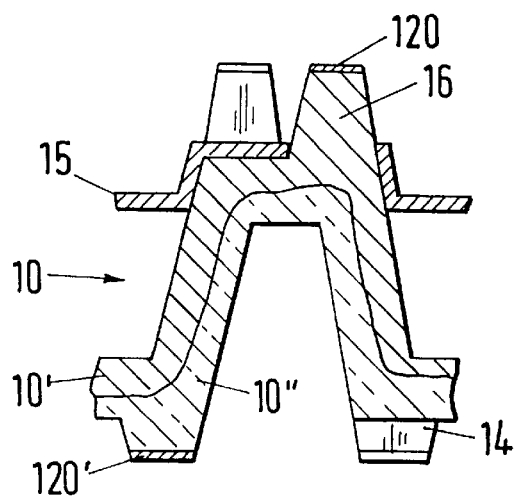
FIG. 6 is a detail of the interconnector of FIG. 4

The pores of the sinter body 10 are at least partly sealed. The sealing is advantageously produced by an enamel which is applied from the air side (for example through the spraying on of a water suspension of enamel particles, then drying and melting of the enamel, with the melt penetrating into the pores as a result of capillary forces). As shown in FIG. 6 a boundary region 101 on the air side can be sealed with enamel, whereas the pores of the remaining part 10" of the sinter body 10 remain open. The enamel on the air side also prevents a liberation of chromium oxide.

In comparison with the film 15 the sinter body 10 is designed with thick walls. The thermal expansion of the interconnector is thereby practically determined by the properties of the sinter body 10 alone. Therefore the film 15 can have a coefficient of thermal expansion which differs from that of the electrolyte 2b. In this respect there is a similarity to the interconnectors which are known from EP-A 0 749 171.

Figure 7:
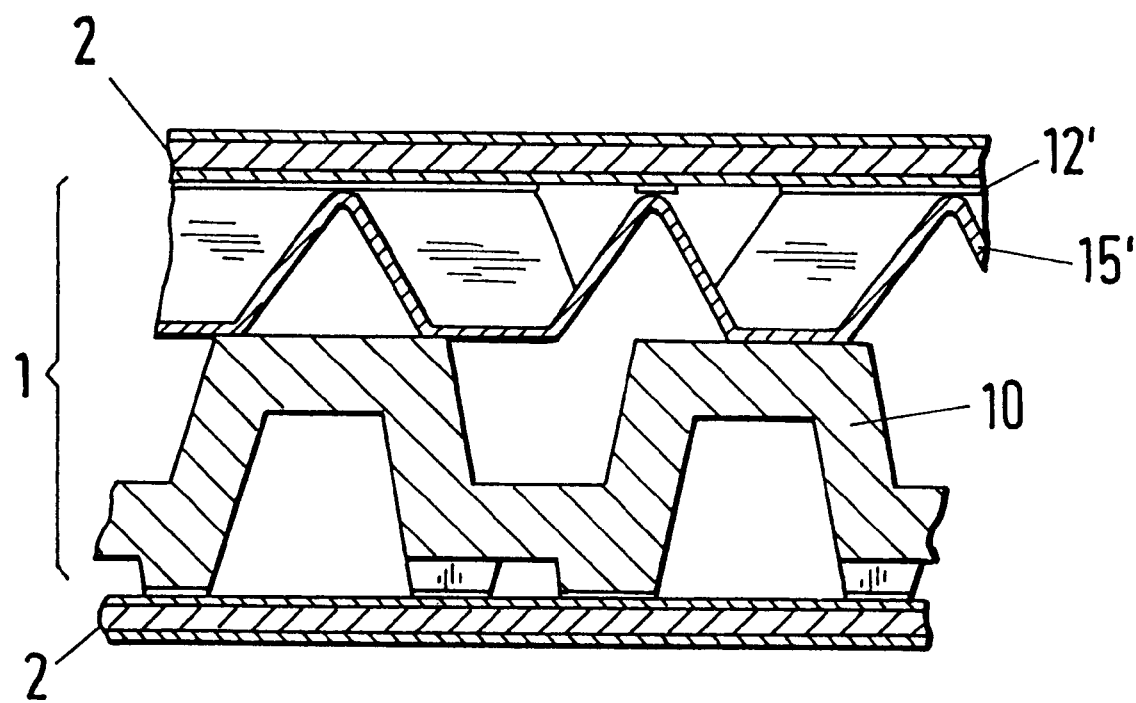
FIG. 7 is a further embodiment of the interconnector in accordance with the invention.

FIG. 7 shows an embodiment of the interconnector 1 in accordance with the invention which is assembled in two layers from a sinter body 10 and a profiled film 15'. An example of the film 151 is disclosed in the European application No. 96810723.5 (=P.6766). Examples of film material include metallic felt or metallic felt parts, which consist of, for example nickel-based alloys that contain chromium and that form volatile chromium oxides in an oxidizing environment. Additionally, an electrically conductive ceramic foam structure may be used, for example. This film 15' must be electrically conducting in contrast to the film 15 of the above described exemplary embodiment. Therefore alloys containing chromium are to be used, which makes covering layers necessary due to the chromium oxide.

The sinter body has a porosity in the range between about 5 and 35%. The porosity preferably amounts to about 20 to 30%.

What is claimed is:

1. An interconnector for high temperature fuel cells that is arranged between a first and second planar electrochemically active element, a first chamber containing a combustion gas, and a second chamber containing oxygen that is separate from the first chamber, and a porous sinter body including pores, wherein the pores are at least partly sealed by a medium in such a manner that a passage of gases between the first and second chamber is prevented, wherein the interconnector comprises the porous sinter body, and wherein the porous sinter body is between the first and second chamber.

2. The interconnector in accordance with claim 1, wherein the sinter body is manufactured from a powder mixture, and wherein the powder mixture is brought substantially into the form of a finished part through compression during the manufacturing process.

3. The interconnector in accordance with claim 1, wherein the sinter body is a part of a heat exchanger for a gaseous oxygen carrier, wherein, together with a second element, at least one passage for the oxygen carrier is formed between a supply point and an outlet opening, and wherein the oxygen carrier is supplied to the first electrochemically active element at the outlet opening, wherein the second element is a film.

4. The interconnector in accordance with claim 1 wherein the sinter body produces a monolithic connection between electrically conducting contact surfaces of the associated first and second electrochemically active element.

5. The interconnector in accordance with claim 1 wherein the sinter body includes chromium, wherein sinter body surfaces that come into contact with oxygen have a coating that acts as a barrier against giving off chromium oxide into the chamber containing oxygen, and wherein the coating is at least partly formed by the pore sealing medium.

6. The interconnector in accordance with claim 5, wherein parts of a surface of the sinter body which are in contact with the first and second planar electrochemically active element are coated with a material that is electrically conducting and that forms a chromium oxide barrier.

7. The interconnector in accordance with claim 1, wherein the sinter body has a porosity in a range between approximately 5 and 35%.

8. The interconnector in accordance with claim 7, wherein the porosity is about 20–30%.

9. A fuel cell battery comprising a stack of fuel cells with interconnectors, wherein each interconnector is arranged between a first and a second planar electrochemically active element, each interconnector including a first chamber containing a combustion gas and a second chamber containing oxygen that is separate from the first chamber, and a porous sinter body including pores, wherein the pores are at least partly sealed by a medium in such a manner that a passage of gases between the first and second chamber is prevented, wherein the fuel cells are substantially centrally symmetric, wherein the combustion gas is fed by a distributor along a stack axis, and wherein at a periphery of the stack there are arranged inlet points for an oxygen carrier and outlet points for the combustion gas and the oxygen carrier after passage through the fuel cells.

10. The fuel cell battery in accordance with claim 9, wherein a structure forming components of the interconnectors are each assembled from a sinter body and a profiled sheet metal film.

* * * * *